(12) United States Patent
Beattie et al.

(10) Patent No.: US 10,107,388 B2
(45) Date of Patent: Oct. 23, 2018

(54) VEHICLE SHIFTER ASSEMBLY

(71) Applicant: Dura Operating, LLC, Auburn Hills, MI (US)

(72) Inventors: Dale A. Beattie, Norton Shores, MI (US); Brian D. Howe, Shelby Township, MI (US); Alberto P. Morales, West Bloomfield, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 371 days.

(21) Appl. No.: 14/971,048

(22) Filed: Dec. 16, 2015

(65) Prior Publication Data

US 2017/0175880 A1 Jun. 22, 2017

(51) Int. Cl.
*F16H 59/08* (2006.01)
*F16H 59/10* (2006.01)
*F16H 61/24* (2006.01)

(52) U.S. Cl.
CPC .......... *F16H 59/105* (2013.01); *F16H 59/08* (2013.01); *F16H 2061/245* (2013.01)

(58) Field of Classification Search
CPC ... F16H 59/105; F16H 59/08; F16H 2061/245
See application file for complete search history.

(56) References Cited

U.S. PATENT DOCUMENTS

| 4,022,078 A | 5/1977 | Malott | |
| 4,519,266 A * | 5/1985 | Reinecke | F16H 59/044 116/DIG. 20 |
| 4,660,430 A * | 4/1987 | Bortfeld | B60K 20/02 200/61.88 |
| 4,853,629 A | 8/1989 | Rops | |
| 5,307,013 A * | 4/1994 | Santos | F16H 59/105 324/207.2 |
| 6,448,670 B1 * | 9/2002 | Onodera | G05G 9/047 307/10.1 |

(Continued)

FOREIGN PATENT DOCUMENTS

JP 2007045390 A 2/2007
WO WO2010026947 A1 3/2010
(Continued)

OTHER PUBLICATIONS

EP Extended Search Report for EP Application No. 16202056.4 dated Apr. 3, 2017 (11 pages).
(Continued)

*Primary Examiner* — David M Fenstermacher
(74) *Attorney, Agent, or Firm* — Reising Ethington P.C.; Matthew J. Schmidt; Robert E. Ford

(57) ABSTRACT

A shift lever assembly may include a shift lever movable about a pivot axis to permit changing a transmission mode, and a sensor element coupled to the shift lever for movement with the shift lever when the shift lever is moved to cause a transmission mode change. The sensor element is movable relative to the shift lever during at least a portion of the movement of the shift lever. This may permit the sensor element to remain at a relatively consistent distance from the sensor, where that distance is measured perpendicular to the sensor, over the path of movement of the sensor element.

20 Claims, 4 Drawing Sheets

(56) References Cited

U.S. PATENT DOCUMENTS

| | | | | |
|---|---|---|---|---|
| 6,485,340 | B1* | 11/2002 | Kolb | B63H 21/213 440/84 |
| 6,550,351 | B1* | 4/2003 | O'Reilly | F16H 59/105 74/335 |
| 6,848,331 | B2* | 2/2005 | Syamoto | F16H 59/0204 74/473.18 |
| 7,334,497 | B2 | 2/2008 | Giefer et al. | |
| 7,571,661 | B2 | 8/2009 | Blondeel et al. | |
| 7,784,375 | B2 | 8/2010 | Bleckmann et al. | |
| 8,253,409 | B2* | 8/2012 | Kitanaka | G01D 5/2497 324/207.11 |
| 8,485,061 | B2 | 7/2013 | Kliemannel et al. | |
| 8,490,509 | B2 | 7/2013 | Giefer et al. | |
| 8,521,376 | B2* | 8/2013 | Katrak | F16H 59/70 701/51 |
| 8,752,448 | B2* | 6/2014 | Giefer | F16H 59/0217 74/473.12 |
| 9,239,248 | B2* | 1/2016 | Zwijze | G01D 5/145 |
| 2002/0002849 | A1* | 1/2002 | Syamoto | B60R 25/063 70/248 |
| 2007/0034041 | A1* | 2/2007 | Dominguis Botella | F16H 59/044 74/523 |
| 2008/0072698 | A1* | 3/2008 | Hirano | F16H 59/0204 74/473.21 |
| 2008/0098849 | A1* | 5/2008 | Wang | F16H 59/0204 74/523 |
| 2010/0307276 | A1* | 12/2010 | Giefer | F16H 59/10 74/473.3 |
| 2011/0005344 | A1 | 1/2011 | Haevescher | |
| 2011/0277578 | A1 | 11/2011 | McGuire et al. | |
| 2012/0144949 | A1* | 6/2012 | Kim | F16H 59/105 74/473.33 |
| 2012/0187940 | A1 | 7/2012 | Uhlenbruck | |
| 2013/0255423 | A1 | 10/2013 | Gill et al. | |

FOREIGN PATENT DOCUMENTS

| | | |
|---|---|---|
| WO | WO2011061223 A1 | 5/2011 |
| WO | WO 2015033322 A2 | 3/2015 |

OTHER PUBLICATIONS

EP Office Action for EP Application No. 16202056.4 dated Mar. 23, 2018 (6 pages).

* cited by examiner

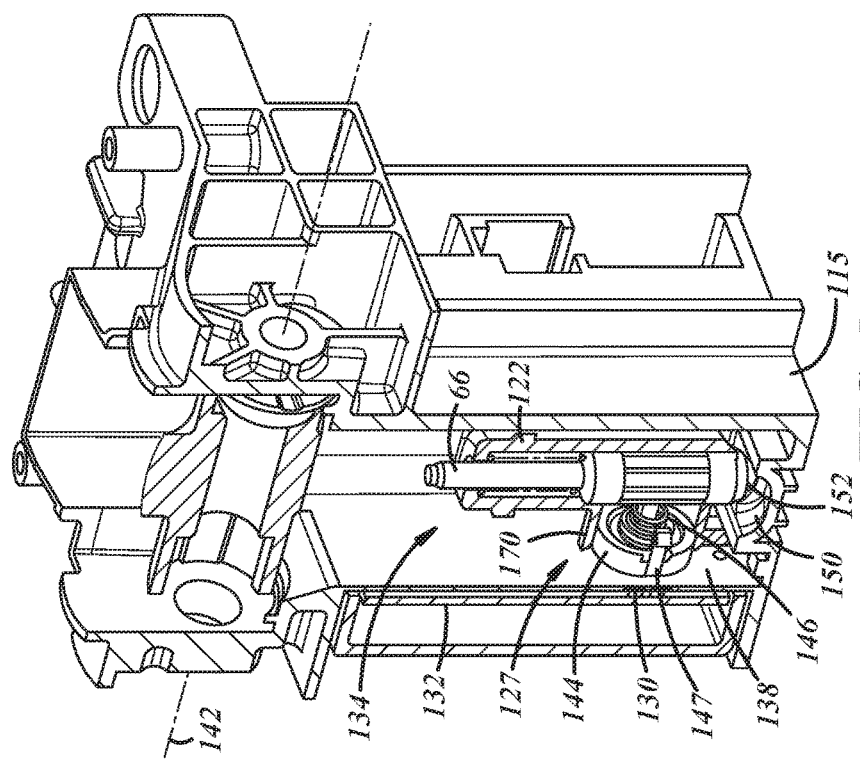
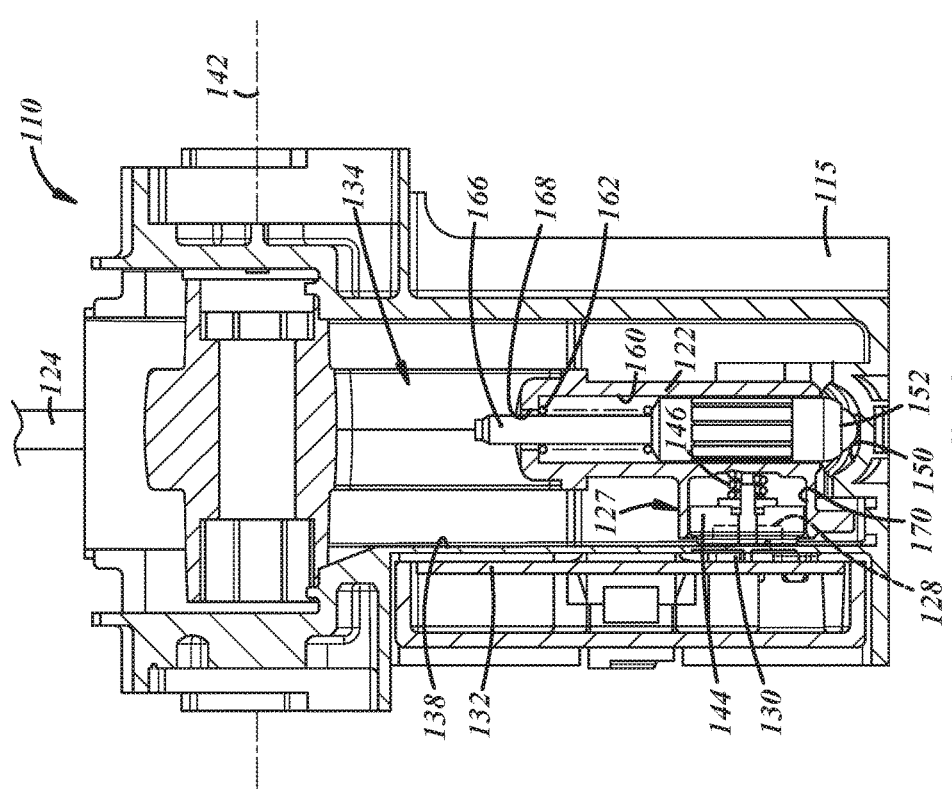

VEHICLE SHIFTER ASSEMBLY

TECHNICAL FIELD

The present disclosure relates to vehicle transmission shifters.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift lever movement to a transmission shift mechanism.

Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator.

SUMMARY

A shift lever assembly may include a shift lever movable about a pivot axis to permit changing a transmission mode, and a sensor element coupled to the shift lever for movement with the shift lever when the shift lever is moved to cause a transmission mode change. The sensor element is movable relative to the shift lever during at least a portion of the movement of the shift lever.

At least some implementations may include one, all or a combination of less than all of the following features. The shift lever may include a housing and the sensor element may include a carrier movably coupled to the housing. The sensor element may include a magnet and the carrier retains the magnet relative to the housing. A biasing member may yieldably bias at least one of the carrier or sensor element relative to the housing. And the sensor element may include a contact surface adapted to engage an adjacent surface during the path of movement, and in some implementations, the magnet does not engage the surface.

A sensor may be located adjacent to the path of movement of the sensor element so that the sensor is responsive to movement of the sensor element. The sensor element may be biased toward the sensor and a wall may be provided between the sensor element and the sensor. In such an arrangement, the sensor element may be biased into engagement with the wall. The wall may be arranged parallel to the sensor and the sensor element may be biased in a direction perpendicular to the wall and parallel to or within 45 degrees of parallel to the pivot axis. In some implementations, the sensor element may be biased in a direction perpendicular to or within 45 degrees of perpendicular to the pivot axis.

In at least some implementations, a vehicle shift lever assembly includes a shift lever, a sensor element and a sensor. The shift lever is pivoted about a pivot axis to permit changing a transmission mode and includes a housing. The sensor element is carried by the housing for movement with the housing when the shift lever is pivoted. And the sensor is responsive to movement of the sensor element as the shift lever is pivoted. The sensor element is biased toward the sensor and movable relative to the housing. In at least some implementations, this may maintain a more consistent distance between the sensor element and the sensor to facilitate accurate determination of sensor element position and/or movement.

In at least some implementations, a mount is provided for the shift lever. Either the mount or the housing includes a wall that is received between the sensor element and the sensor, and the sensor element is biased toward the wall. The sensor element may include a carrier and a magnet, and at least one of the carrier or the magnet may be biased into engagement with the wall over at least a majority of the path of motion of the sensor element. The sensor element may be biased in a direction parallel to or within 45 degrees of parallel to the pivot axis, or perpendicular to or within 45 degrees of perpendicular to the pivot axis. A follower may be carried by the housing for movement with the housing and relative to a contoured track as the shift lever is moved. The follower may be movable relative to the housing and yieldably biased relative to the housing so that the follower may ride over contours in the track without also moving the housing.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which:

FIG. 4 is a side view of a portion of a mount and shift lever housing of a shift lever assembly;

FIG. 5 is a perspective view of the mount and shift lever housing of FIG. 4.

DETAILED DESCRIPTION OF PREFERRED EMBODIMENTS

Figure 1:
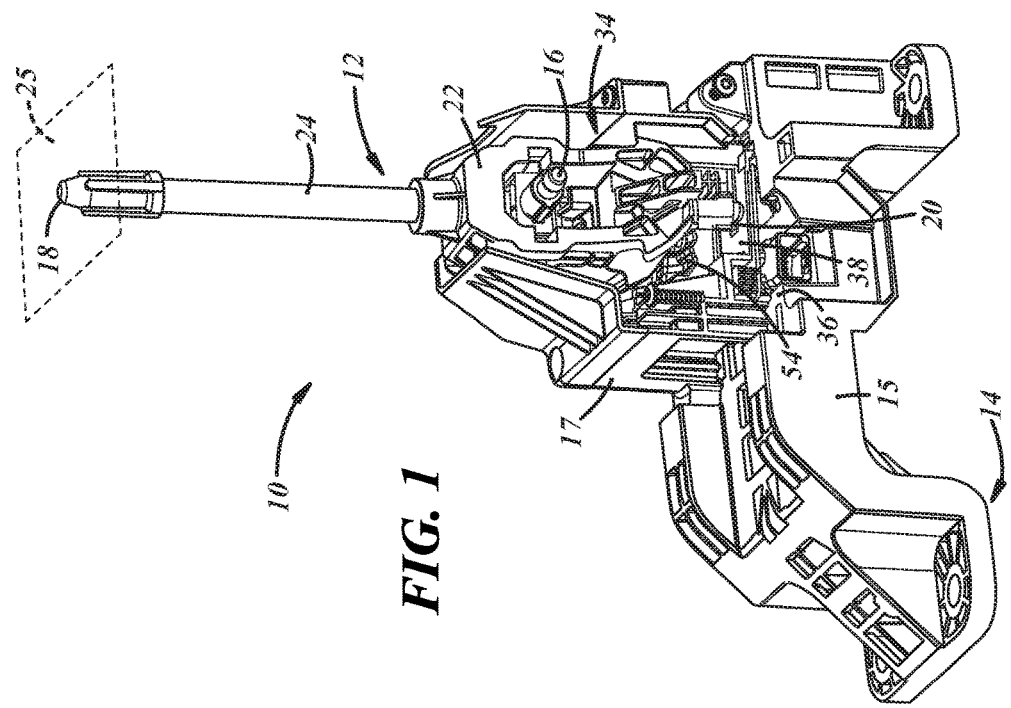
FIG. 1 is a perspective view of a portion of a vehicle shift lever assembly and a mount for the shift lever with a portion of the mount removed to show certain components of the shift lever.

Referring in more detail to the drawings, FIG. 1 shows a vehicle shift lever assembly 10 that may be used to change a mode of a vehicle transmission (e.g. cause a transmission gear change). The assembly 10 includes a gear shift lever 12 that may be moved to shift the transmission among various modes, typically including park, neutral, reverse and forward drive gears. The shifting system of which the shift lever assembly 10 is a part may be a so-called "shift by wire" system where an operator command for a gear shift is electrically transmitted to a transmission shift actuator that is coupled to a shift mechanism of the transmission to cause the actuator to shift the transmission.

In at least some implementations, the shift lever assembly 10 may include or be coupled to a mount 14 that is connected to the vehicle. The mount 14 as shown includes a bracket 15 and a housing 17 coupled to the mount, with the housing receiving and covering part of the shift lever 12. In at least some implementations, the shift lever 12 is coupled to the mount 14 (e.g. at housing 17) at a pivot 16 located between the ends 18, 20 of the shift lever 12. In the implementation shown, the shift lever 12 includes a housing 22 and a rod 24 extending from the housing 22. The rod 24 may have a free end defining end 18 of shift lever 12 and adapted to receive a handle or knob 25 (shown in dashed lines in FIG. 1) that the driver grasps and applies force to in order to pivot the shift lever 12 and cause a gear change, as set forth in more detail below. The housing 22 may be associated with or carry one or more sensor components. The sensor components permit sensing and determination of shift lever positions which can be used to cause the shift actuator to shift the transmission to a selected drive mode or gear.

There are different ways to generate an electrical signal to monitor or detect shift lever position and communicate the signal with a control unit to actuate the shift actuator to a desired drive mode or gear. As an example, a sensor element 27 may be attached to the shift lever 12, and one or more sensors 30 may be mounted (e.g. on a printed circuit board (PCB) 32) in the area of the sensor element 27 and/or a path of movement of the sensor element 27. In such an arrangement, as the shift lever 12 is moved to cause a gear change, the sensor element 27 is moved relative to the sensors 30 which are responsive to and can detect such movement. The sensors 30 provide an output that corresponds to the sensor element position or movement and the sensor output is communicated with one or more controllers. In turn, the controller(s) is/are operable to control the shift actuator and cause a shift to occur corresponding to the drive mode selected by the driver. Of course, other arrangements may be implemented.

The sensor element 27 may include any object the presence or motion of which may be detected by the sensor 30. In at least some implementations, the sensor element 27 includes a magnet 28 (FIG. 3) and the sensors 30 are responsive to or detect presence of a magnetic field, strength of the magnetic field, changes in the magnetic field or movement of the magnetic field. The sensors 30 may be a hall effect type sensor, hall effect switch or series of switches, reed switches or any other magnetically sensitive or responsive sensor. The sensors 30 may include one or more than one sensor or sensing element, switch or other element arranged along the path of movement of the sensor element 27 as the shift lever 12 is pivoted.

Figure 2:
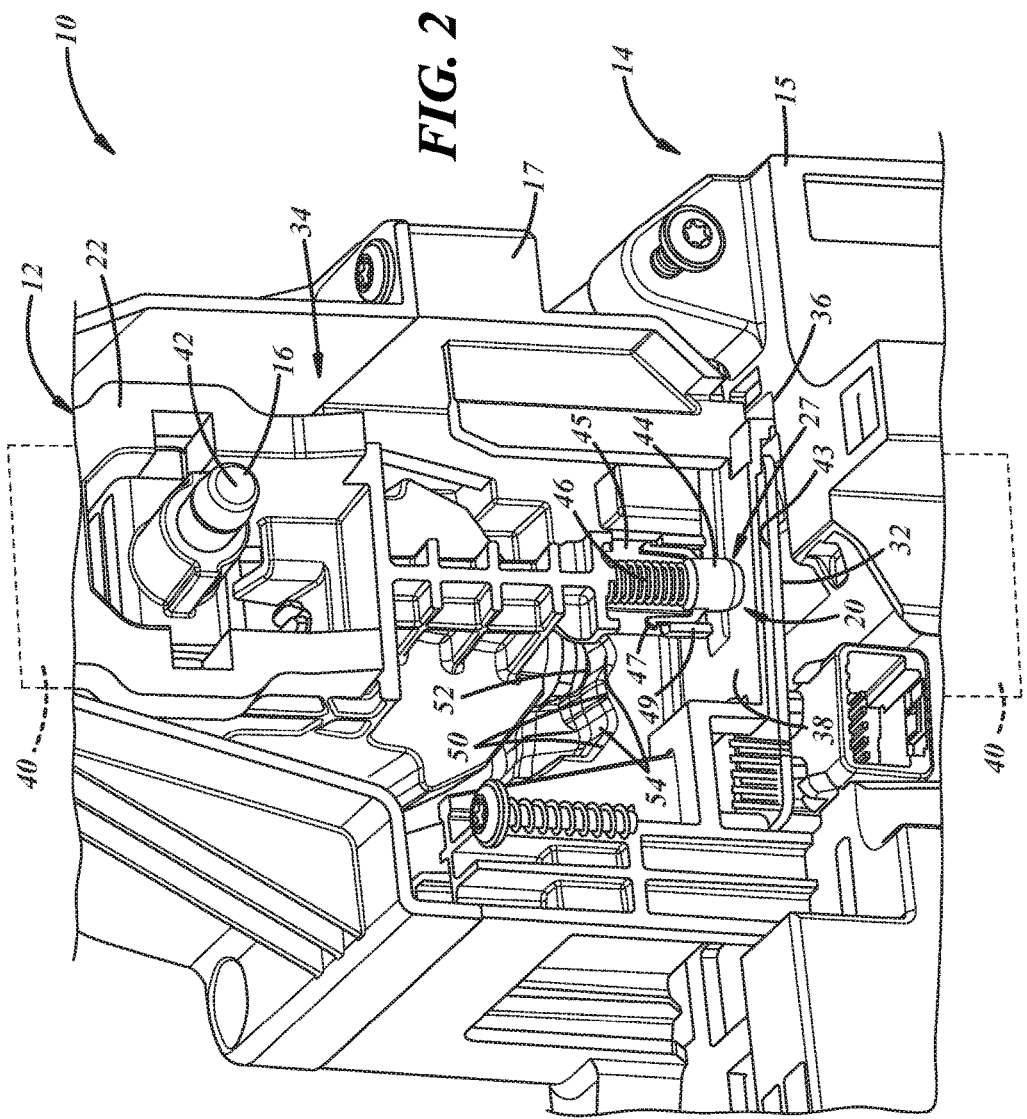
FIG. 2 is an enlarged, fragmentary perspective view of a portion of a vehicle shift lever assembly and mount.

In at least some implementations, the mount 14 defines all or part of an enclosure 34 in which the shift lever housing 22 is received. The enclosure 34 may be communicated with a passenger compartment of the vehicle into which the shift lever rod 24 may protrude. Because the shift lever 12 protrudes into the passenger compartment and is pivoted, it may not be practical or cost effective to provide a fluid-tight seal around the shift lever. Hence, liquids or other contaminants may be spilled or otherwise introduced into the enclosure 34 from the passage compartment. To protect the PCB 32 and sensors 30 from such contaminants, the enclosure 34 may be generally fluid-tight or sealed (at least in areas other than from where the shift lever protrudes), and the PCB 32 may be located outside of the enclosure, as shown in FIGS. 1 and 2. In the example shown, the PCB 32 is mounted on or adjacent to a base 36 of the mount bracket 15, and the PCB 32 is separated from the enclosure 34 by an intervening wall 38. The intervening wall 38 may thus be between the sensors 30 on the PCB 32 and the sensor element 27 that moves with the shift lever 12, and the sensors may be responsive to the magnetic field that passes through the wall 38.

In the implementation shown, the magnet 28 is carried by the shift lever housing 22 for reciprocation as the shift lever 12 is pivoted. Hence, as the shift lever 12 is pivoted, the magnet 28 is moved relative to the PCB 32 and sensor(s) 30. In this implementation, the magnet path of movement is within a plane 40 (FIG. 2) that is perpendicular to the wall 38 and PCB 32. If the magnet 28 were fixed relative to the housing 22 which is fixed relative to the pivot 16 and an axis 42 thereof, then the magnet 28 would reciprocate along an arc defined by the fixed distance of the magnet 28 from the pivot axis 42. This arc would be convex relative to the PCB 32 and include regions wherein the magnet 28 is spaced farther from the wall 38 and PCB 32 than in other areas. Movement of the magnet 28 away from the PCB 32 and sensor 30 can make detection of the magnetic field more difficult or less accurate, and the farther away the magnet is moved, the less accurate and more difficult accurate sensing of the magnet position becomes.

To reduce or eliminate the movement of the magnet 28 away from the PCB 32 and sensors 30 (i.e. in a direction perpendicular to an adjacent surface 43 of the PCB 32, which may be generally planar and generally parallel to the axis 42), the sensor element 27 may be biased into engagement with the wall 38 which is a fixed distance from the PCB 32. In at least some implementations, the sensor element 27 is movably carried by the shift lever housing 22. In the implementation shown, the sensor element 27 includes the magnet 28 and a carrier 44 to which the magnet 28 is mounted or otherwise coupled. The carrier 44 is coupled to the shift lever housing 22, such as in a pocket 45 of the housing 22, for movement relative to the housing 22 and the pivot axis 42. A biasing member, such as a spring 46, acts on the carrier 44 and tends to extend the carrier 44 from the housing and away from the pivot axis 42 and toward the wall 38 and sensor 30. Hence, as the shift lever 12 is pivoted, the housing 22 sweeps along an arc but the carrier 44 and magnet 28 move along a relatively straight path defined by engagement of one or both of the carrier 44 and magnet 28 with the wall 38. That is, as an end of the housing 22 adjacent to the wall 38 moves away from the wall during a portion of the shift lever movement, the spring 46 moves the carrier 44 outwardly from the housing 22 so that the carrier 44 remains engaged with the wall 38. As the shift lever 12 is pivoted in the opposite direction, the housing 22 moves back toward the wall 38 and the carrier 44 is retracted or slides further into the housing 22 while remaining engaged with the wall 38. Hence, the magnet 28 is maintained a fixed distance from the PCB 32. Overlapping flanges 47, 49 may be provided on the carrier 44 and housing 22, to inhibit or prevent unintended removal of the carrier from the housing.

In the example shown, the carrier 44 engages the wall 38 and the magnet 28 does not directly engage the wall, to avoid wear on the magnet which may change the magnetic field properties (orientation, strength, etc). However, the magnet 28 may engage the wall 38 (e.g. it may protrude from the carrier, or a magnet may be provided without any carrier), or an intervening element may be provided to, for example, reduce friction and/or reduce wear of the carrier 44 or magnet 28.

Because the magnet 28 is maintained a consistent distance from the PCB 32 (or a plane parallel to the PCB, or surface 43), the sensors 30 may more accurately sense the magnet position along its path of movement. Without the consistent sensing distance, a more powerful and expensive magnet 28 would need to be used, or a more sophisticated sensors 30 having greater resolution or improved signal control would have to be used, or both.

If desired, the shift lever assembly 10 may include shift position features that change the force needed to move the shift lever 12 along one or more portions of the shift lever movement. This may provide tactile feedback to the user with regard to the location of the various shift positions and when the shift lever 12 has transitioned from one position to the next. This may also facilitate retention of the shift lever 12 in a desired or selected position for continued vehicle operation in the selected gear.

In the implementation shown, the shift position features include one or more detents or contours 50 (FIG. 2) and a follower 52 that moves along those contours as the shift lever is moved. The detents or contours 50 may include oppositely inclined or curved surfaces defining concave depressions or stations 54, with each station 54 corresponding to one of the gear positions that may be selected. In the implementation shown, the follower 52 is carried by the shift lever housing 22 and as the shift lever 12 is pivoted, the follower 52 is moved relative to and among the stations 54. In other implementations, the follower 52 may be fixed and the stations 54 may be formed in a body that moves with the shift lever 12.

As the follower 52 moves relative to a surface that is inclined toward the pivot axis 42 (relative to the direction of movement of the follower 52), more force must be applied to the shift lever 12 (greater shift effort) to move the follower 52 over that surface. A declining surface (inclined away from the pivot axis 42 relative to the direction of movement of the follower 52) requires increasingly less force to move the follower along. Hence, shift lever feel may be provided where shifting out of a position initially requires more effort until, for example, a midpoint between two stations 54 is passed and then the follower 52 nears the next station wherein shift effort is reduced. The follower 52 or body in which the stations 54 are formed may be yieldably biased to provide a desired feel or shift effort associated with the relative movement between the follower 52 and surfaces defining the stations 54.

In the implementation shown, the follower 52 and sensor element 27 move along paths that are laterally offset and parallel. In this implementation, both the follower 52 and sensor element 27 are oriented generally parallel (e.g. within 45 degrees of parallel, and in some implementations, within 20 degrees) to the rod 24 of the shift lever 12 and their paths of movements are within planes that are perpendicular to the pivot axis 42. Further, the sensor element 27 is biased in a direction that is perpendicular (plus or minus 45 degrees) to the pivot axis 42, and the PCB 32 and sensors 30 are arranged generally parallel to the pivot axis 42. Hence, the sensor element 27 is biased toward and generally perpendicular to the PCB 32 and sensors 30.

Figure 6:
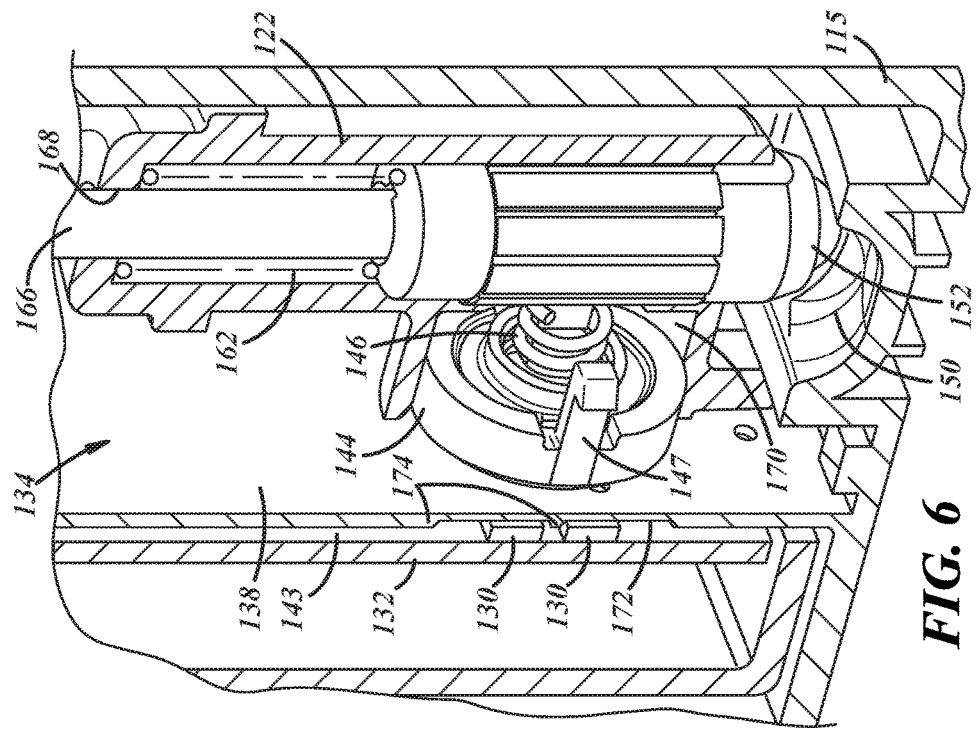
FIG. 6 is an enlarged, fragmentary sectional view of a portion of the mount and shift lever housing.
Figure 3:
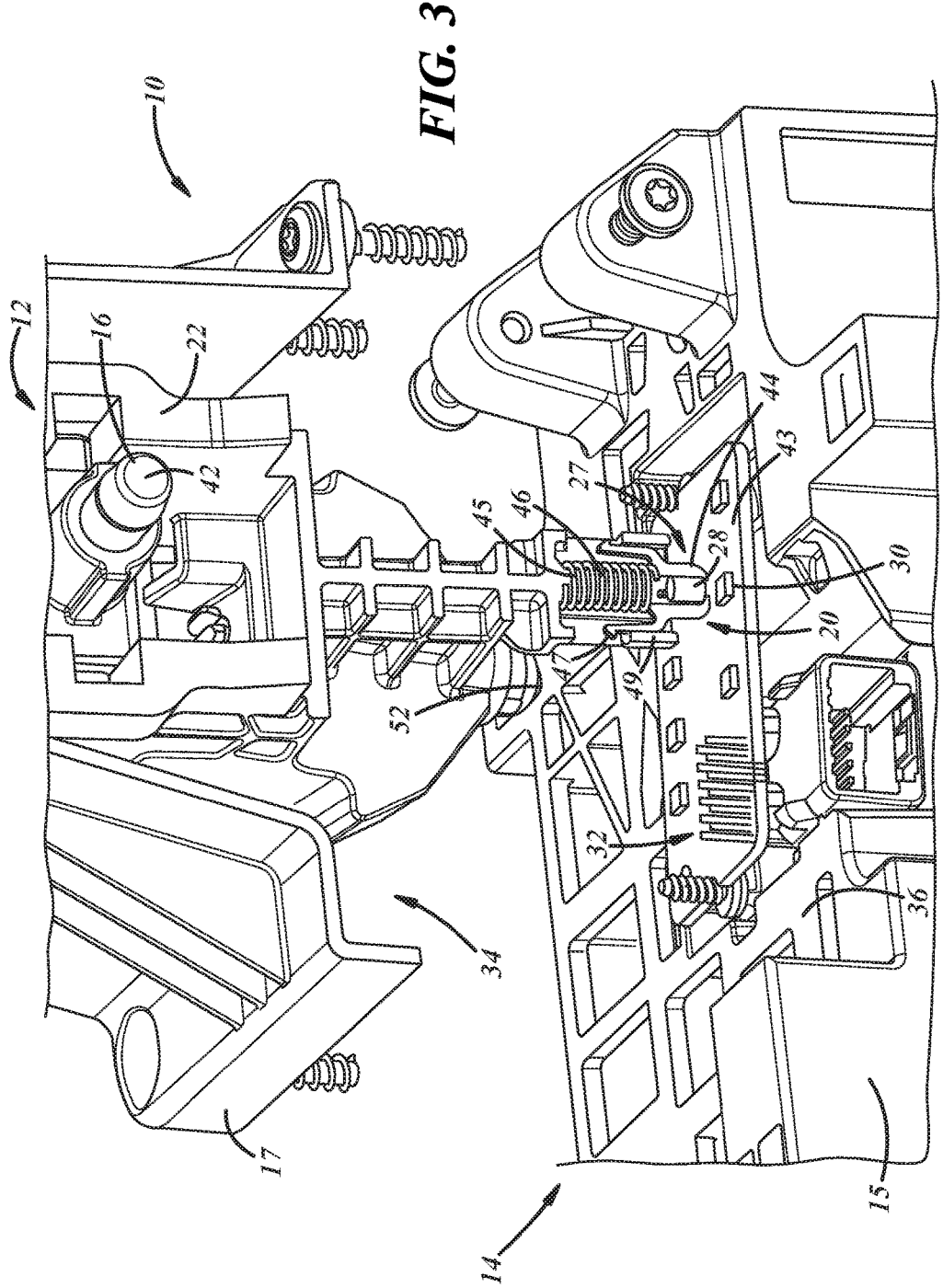
FIG. 3 is an enlarged, exploded, perspective view of a portion of the vehicle shift lever assembly and mount with an intervening wall of the mount removed to better show a circuit board.

FIGS. 4-6 illustrate a shift lever assembly 110 that may be constructed and arranged similarly to the shift lever assembly 10 of FIGS. 1-3 described above, and that may operate in substantially the same manner. For ease of description, the same or similar components in shift lever assembly 110 will be given reference numbers offset by one hundred from the reference numbers given to their counterpart components in the shift lever assembly 10. In more detail, FIGS. 4-6 illustrate a portion of the mount 114 (e.g. housing 115) defining enclosure 134, an area where the PCB 132 is located, and a portion of the shift lever housing 122, track 150 and follower 152. The remainder of the shift lever assembly 110 may be constructed and arranged like shift lever assembly 10, or otherwise as desired.

In this implementation, the follower 152 is carried by the shift lever housing 122 for movement along a contoured track 150 including multiple stations 154 generally as described above. The follower 152 may be received within a cavity 160 in the housing 122 for reciprocation relative to the housing 122, and a spring 162 or other biasing member may yieldably bias an end of the follower 152 into engagement with the track 150. The follower 152 may include a stem 166 that extends through an opening 168 in the housing 122 and which may provide support or guidance for the follower 152 as it is displaced by the track 150 when the shift lever 112 is moved. To retain the spring 162 in position relative to the follower 152, it may be a coil spring received within the cavity 160 and around the stem 166. The follower 152 may extend generally parallel to the shift lever rod 124, and its path of movement may be received within a plane that is generally perpendicular to the pivot axis 142 (where in at least some implementations "generally" equals within 45 degrees, which in some implementations may be within 20 degrees). As the follower 152 moves over the track 150, the follower 152 is displaced relative to the housing 122 by contoured surfaces of the track 150, as described above. In at least some implementations, the housing 122 is fixed relative to the pivot axis 142 and does not move as the follower 152 moves. Of course, other arrangements are possible.

As in the previous implementation described above, a sensor element 127 may be associated with the shift lever assembly 110 and moved relative to one or more sensors 130 to enable determination of the shift lever position, at least within a certain range of movement of the shift lever. The sensor element 127 may include a magnet 128 (FIG. 4) that is carried by the housing 122. In the implementation shown, the magnet 128 is retained on or within a carrier 144 that is received within a pocket 170 or cavity of the housing 122 (and retained by flanges 147 which engage the housing 122). The pocket 170 opens laterally, in a direction generally parallel to the pivot axis 142. The pocket 170 faces a wall 138 of the housing 122, shown as a sidewall that is oriented in a plane generally perpendicular to the pivot axis 142. To sense the magnetic flux of the magnet, the PCB 132 may be arranged on the opposite side of the wall 138 as the magnet 128 and the PCB may include one or more sensors 130 as noted above. The PCB 132 and sensor(s) 130 are thus oriented generally perpendicular to the pivot axis 142.

In this arrangement, the sensor element 127 (and its magnet 128) is moved along an arcuate path as the shift lever is moved, and the arcuate path is within a plane that is parallel to the wall 138, PCB 132 and sensor 130. In this way, the distance between the magnet 128 and the wall 138 does not significantly change as the magnet 128 is swept along its arcuate path (within the tolerances of the components of the assembly).

To improve this maintained or consistent distance between the magnet 128 and PCB 132 and sensor(s) 130, the sensor element (e.g. magnet carrier 144) may be yieldably biased, such as by a spring 146, laterally outwardly relative to the housing 122. In this implementation, the sensor element 127 is biased in a direction parallel to the pivot axis 142, and toward and generally perpendicular to the PCB 132 and sensors 130. As in the embodiment discussed above, the carrier 144 may have a contact portion that engages the wall 138. This enables smooth movement of the carrier 144 relative to the wall 138 even with dimensional variations within a production run due to part tolerances, to provide a more consistent distance between the magnet 128 and sensors 130 across a production run of shift lever assemblies 110. To further improve the communication between the magnet 128 and sensors 130, the wall 138 may include thinner sections 172, such as in the area of the sensors 130. The wall may also include thicker sections 174 between adjacent thinner sections 172 and the thicker sections 174 may simply be for structural support, or they may aid in sensing a transition of the shift lever from one position to an adjacent position, such as by providing a known interruption or interference with the magnetic field when the magnet 128 passes near or past that area of the wall 138.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A vehicle shift lever assembly, comprising:
   a shift lever movable about a pivot axis to permit changing a transmission mode; and
   a sensor element coupled to the shift lever for movement with the shift lever when the shift lever is moved and wherein the sensor element is movable relative to the shift lever during at least a portion of the movement of the shift lever.

2. The assembly of claim 1, wherein the shift lever includes a housing and the sensor element includes a carrier movably coupled to the housing.

3. The assembly of claim 2, wherein the sensor element includes a magnet and the carrier retains the magnet relative to the housing.

4. The assembly of claim 3, wherein the sensor element includes a contact surface adapted to engage an adjacent surface during the path of movement and wherein the magnet does not engage the surface.

5. The assembly of claim 2, which also includes a biasing member that yieldably biases at least one of the carrier or sensor element relative to the housing.

6. The assembly of claim 5, wherein the sensor element is biased in a direction perpendicular to or within 45 degrees of perpendicular to the pivot axis.

7. The assembly of claim 5, wherein the sensor element is biased in a direction parallel to or within 45 degrees of parallel to the pivot axis.

8. The assembly of claim 7 which also includes a follower carried by the housing for movement with the housing, the follower adapted to engage and move relative to a contoured track as the shift lever is moved.

9. The assembly of claim 8 wherein the follower is movable relative to the housing and yieldably biased relative to the housing.

10. The assembly of claim 1, which also includes a sensor located adjacent to the path of movement of the sensor element and responsive to movement of the sensor element.

11. The assembly of claim 10, wherein the sensor element is biased toward the sensor.

12. The assembly of claim 10, which also includes a mount adapted to couple the shift lever to a vehicle, wherein the sensor is carried by the mount and a wall is provided between the sensor and the sensor element.

13. The assembly of claim 12, wherein the sensor element is biased toward the wall.

14. The assembly of claim 12, wherein the sensor is mounted on a circuit board and the wall is arranged parallel to a surface of the circuit board adjacent to the wall and the sensor element is biased into engagement with the wall.

15. The assembly of claim 14 wherein the sensor element includes a carrier and a sensor element carried by the carrier for movement with the carrier, and wherein the carrier is biased into engagement with the wall.

16. A vehicle shift lever assembly, comprising:
   a shift lever pivoted about a pivot axis to permit changing a transmission mode and including a housing;
   a sensor element carried by the housing for movement with the housing when the shift lever is pivoted;
   a sensor responsive to movement of the sensor element as the shift lever is pivoted, wherein the sensor element is biased toward the sensor and movable relative to the housing.

17. The assembly of claim 16 which also includes a mount to which the shift lever is coupled, wherein one of the mount and the housing includes a wall that is received between the sensor element and the sensor and wherein the sensor element is biased toward the wall.

18. The assembly of claim 17 wherein the sensor element includes a carrier and a magnet, and at least one of the carrier or the magnet is biased into engagement with the wall over at least a majority of the path of motion of the sensor element.

19. The assembly of claim 17 wherein the sensor element is biased in a direction parallel to or within 45 degrees of parallel to the pivot axis.

20. The assembly of claim 17 wherein the sensor element is biased in a direction perpendicular to or within 45 degrees of perpendicular to the pivot axis.

* * * * *